United States Patent
Sharpe et al.

[11] Patent Number: 5,877,699
[45] Date of Patent: Mar. 2, 1999

[54] DISPLAYING DATA TRANSMITTED BY RADIO

[75] Inventors: Anthony K. Sharpe; Andrew D. McPherson, both of Cambridge, England

[73] Assignee: U.S. Philips Corporation, New York, N.Y.

[21] Appl. No.: 668,551

[22] Filed: Jun. 21, 1996

Related U.S. Application Data

[63] Continuation-in-part of Ser. No. 410,545, Mar. 23, 1995, abandoned.

[30] Foreign Application Priority Data

Jun. 5, 1992 [GB] United Kingdom ................... 9212056

[51] Int. Cl.[6] ............................................. H04Q 7/14
[52] U.S. Cl. ..................................................... 340/825.44
[58] Field of Search ........................... 340/825.44, 311.1; 379/67; 455/344, 346, 347, 349, 31.2, 38.4

[56] References Cited

U.S. PATENT DOCUMENTS

| | | | |
|---|---|---|---|
| 4,534,063 | 8/1985 | Krumin et al. | 455/344 |
| 4,675,861 | 6/1987 | Uttermark | 370/4 |
| 4,803,487 | 2/1989 | Willard et al. | 340/825.44 |
| 4,804,955 | 2/1989 | Yoshizawa | 340/825.44 |
| 4,851,820 | 7/1989 | Fernandez | 340/825.44 |
| 4,967,194 | 10/1990 | Haruki | 340/825.44 |
| 5,016,273 | 5/1991 | Hoff | 340/925.44 |
| 5,245,649 | 9/1993 | Eaton et al. | 379/67 |

FOREIGN PATENT DOCUMENTS

| | | | |
|---|---|---|---|
| 0232123 B1 | 8/1987 | European Pat. Off. | G08B 3/10 |
| 0426966 A2 | 5/1991 | European Pat. Off. | G08B 3/10 |
| 59-169237 | 9/1984 | Japan | H04B 9/00 |
| 2247332 | 2/1992 | United Kingdom | G09G 5/00 |
| 88/08649 | 11/1988 | WIPO | H04B 7/15 |
| 90/13213 | 11/1990 | WIPO | H04Q 7/02 |
| 91/11889 | 8/1991 | WIPO | H04Q 7/00 |

OTHER PUBLICATIONS

"Fiber Optic Microcellular Radio" by T.S. Chu et al, 41st IEEE Vehicular Technology Conference, May 19–22, 1991, pp. 339–344.

*Primary Examiner*—Edwin C. Holloway, III
*Attorney, Agent, or Firm*—Jack D. Slobod

[57] ABSTRACT

A display system comprises a display apparatus such as an electronic notice board, TV set or computer monitor. Radio messages are received by a point-to-point receiving apparatus, such as a wide area digital pager, adjustably mounted relative to the display apparatus. The receiving apparatus generates non-electrical signals which are transmitted to the display apparatus, the display apparatus displaying said signals. The receiving apparatus is adjusted to minimize the error rate in the signal received by said apparatus.

6 Claims, 2 Drawing Sheets

DISPLAYING DATA TRANSMITTED BY RADIO

This application is a Continuation-in-Part of application Ser. No. 08/410,545 filed Mar. 23, 1995, now abandoned.

TECHNICAL FIELD

The present invention relates to the displaying of data transmitted by radio, and particularly, but not exclusively, to updating stored data by means of radio transmission.

BACKGROUND OF THE INVENTION

In applications such as electronic notice boards, it is frequently required to update the information displayed. The updating can be done by transmissions through landlines from a central station, which has the disadvantage that the electronic notice board cannot be readily moved around. Alternatively, the user equipment may incorporate a dedicated radio receiver which is hard wired into the electronic notice board and any updating is done by way of a radio transmission. Such an equipment is disclosed in British Patent Specification GB 2 247 332 A. Building a radio receiver into the electronic notice board or other end user equipment has a number of drawbacks, in that 1) the positioning of the equipment has to be a compromise between viewability and the best possible reception of radio signals, and 2) any equipment containing a radio receiver has to be submitted for type approval by the Radio Regulatory Authorities. Individual type approval is necessary because, amongst other things, an electrically conductive link between the radio receiver and the end user equipment may affect the radio frequency (r.f.) properties of the radio receiver. The consequence of this is that a manufacturer of equipment will be reluctant to have too many models because of the time and cost of obtaining type approval.

SUMMARY OF THE INVENTION

An object of the present invention is to convey data messages to a display apparatus without the necessity for the receiving equipment to be type approved each time.

According to a first aspect of the present invention there is provided a display system, comprising a radio-less display unit, means for semi-permanently adjustably affixing a point-to-point radio apparatus to said display unit so that said radio apparatus may be oriented to substantially best receive a radio signal, said orientation of said radio apparatus being substantially independent of a current orientation of said display unit; and means for receiving an optical radiation signal transmitted from said radio apparatus.

The present invention also provides a display system comprising a display apparatus which does not require radio-type approval, means for receiving a non-electrical signal from a point-to-point apparatus for display on said display apparatus so that said display apparatus may be positioned for maximum desired viewability with at most a minimal error rate in the signal receivable at the location of said display apparatus.

The present invention further provides a display system comprising a display apparatus which does not require radio-type approval as a pager, a point-to-point radio receiving apparatus having means for producing a non-electrical signal corresponding to a signal received by said receiving apparatus, and means for semi-permanently affixing said radio receiving apparatus to said display apparatus so that said display may be positioned for maximum desired viewability with at most reduction of the quality of the radio signal receivable at the location of said display apparatus.

In accordance with the present invention, the point-to-point receiving apparatus is a self contained unit which is physically independent of the display apparatus, e.g., a TV set, a monitor of a personal computer, electronic notice board or other information display/or storage device. By using a visible/non-visible radiation link, the r.f. properties of the display apparatus are not altered, and in consequence, the radio receiving means is the only part of the system which requires type approval. Thus, a single class of type approved radio receiving apparatus can be used with any number of classes of display apparatus, or other such end user equipment without the need to seek separate type approval for each display.

The radio receiving apparatus may comprise, for example, a message pager with, or without, its own message memory.

The receiving apparatus may be mounted in the best position for receiving signals from a central station. The link from the receiving means to storage means in the display or user apparatus may comprise a light emitting diode in the receiver which is coupled to the storage means by an optical fiber which is terminated by a suitable decoder to convert optical signals into electrical signals suitable for storage.

Alternatively, the receiving means may be equipped with an infra-red emitter and the storage means with an infra-red receiver. Such an arrangement offers great flexibility in the relative positioning of the receiving means and the storage means, especially when incorporated in an end user device.

The positioning of the radio receiving apparatus may be determined by minimizing the error rate in the received signal.

It is known from Japanese published patent application 59-169237 to provide two-way data transfer between a portable terminal and a data transmitter by means of optical couplings. Both the portable terminal and the data transmitter have a photodetector and a light emitting diode. The portable terminal is received in a recess in the data transmitter, and the data transmitter's photodetector and LED are disposed opposite the portable terminals LED and photodetector, respectively. There is no disclosure of relaying data via a radio frequency link and physically separating the data terminal from the data transmitter.

European Patent Specification 0 232 123 discloses a radio pager in which calling address signals together with time signals are stored by the pager in a random access memory. In response to a manual command signal the contents of a memory are read out and supplied to a light emitting device. More particularly, in order to print out the stored address signals, a photodetector is juxtaposed with the light emitter, the photodetector being connected to the printer. In order to provide the necessary juxtapositioning of the light emitter and photodetector, the printer has a light shield and the pager is inserted into the light shield in order to effect the optical coupling between the light emitter and the photodetector. There is no suggestion in that publication of address and time signals being printed out as they are received.

European Patent Specification 0 426 966 discloses the use of a pager with a separate TV set for additional message display. The pager may relay message data to the TV set by way of a bi-directional infra red link or an electrical communication cable coupled to the pager and the TV set. The use of an infra-red link means that the pager and TV set have to be arranged to provide a line of sight path which means that the pager may not be optimally positioned with respect to the reception of radio messages. Using an electrical communication cable has the drawback of desensitizing the receiver.

BRIEF DESCRIPTION OF THE DRAWING

In the drawing.

The present invention will now be described, by way of example, with reference to the accompanying drawings, in which.

In the various figures of the drawings, like reference numerals have been used to indicate corresponding features.

DETAILED DESCRIPTION

Figure 1:
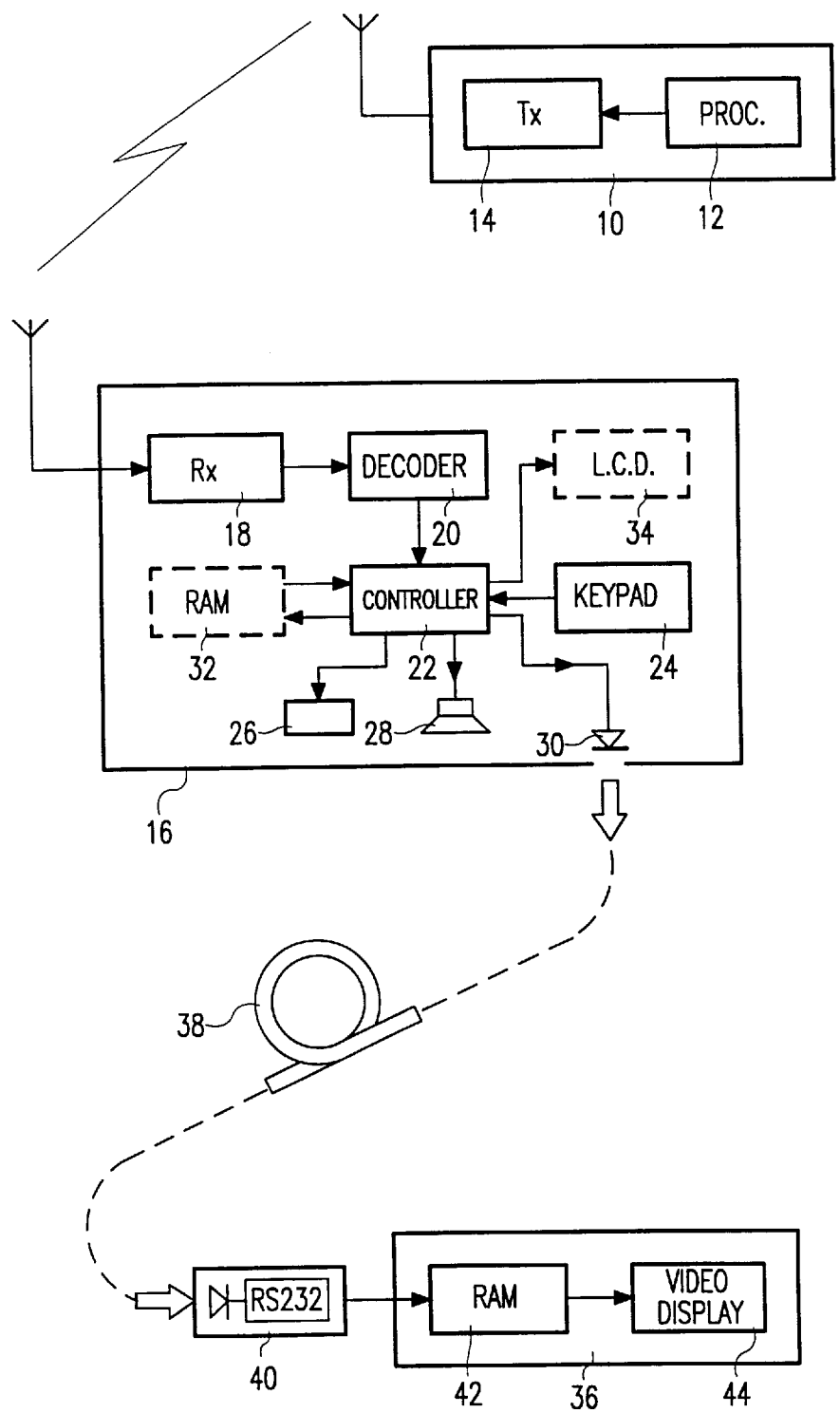
FIG. 1 is a block schematic diagram of one embodiment of the invention.

FIG. 1 illustrates a digital paging system comprising a base station 10 including a processor 12 for formatting address and message data to be transmitted by a transmitter 14. Any suitable address and message format can be used, for example, the Committee Consultative International Radio (CCIR) Radiopaging Code No. 1, otherwise known as POCSAG (Post Office Code Standardization Advisory Group). Details of this radiopaging code are given in a book entitled "The book of the CCIR Radiopaging Code No. 1", published by the Radiopaging Code Standards Group (RCSG) in 1986. Appendix 1 therein discloses the Specification for a standard Code Format for use in Wide Area Radiopaging Systems the details of which will be known by those skilled in the art.

However, for the sake of completeness of this disclosure, the signal format described therein comprises a batch structure consisting of preamble and a succession of concatenated batches. Each batch consists of a synchronization codeword plus 8 frames each comprising 2 codewords, making a total of 17 codewords. There are two types of codewords, address codewords and message codewords, each comprising 32 bits. In the case of a message codeword 20 bits form a data field. Bits 20 and 21 of an address codeword are function bits and are used to select the format of decoding of concatenated message codewords. Appendix 1, subsection 4.1 states that for the sole transmission of messages in decimal numbers, 4 bits per character are used and the function bits are set to 00. Subsection 4.2 refers to an Alpha-numeric or General Data Format and states that the International Standards Organization (ISO) 7-bit coded character set is used and that the function bits are set to 11. When sending a message, the batch structure is maintained. Thus, a message comprises an address codeword and concatenated message codewords plus a synchronization codeword at the beginning of each batch.

The illustrated system further comprises a pager 16, which may be either a numeric or alphanumeric message pager with, or without, its own message memory. The pager 16 comprises a radio frequency receiver 18 which is tuned, or tunable, to receive the address and message data transmitted by the base station 10. The receiver 18 is periodically energized to receive the synchronization codeword in each batch and to be able to receive any address codewords transmitted in its predetermined frame and any concatenated message codewords.

The receiver 18 has an output to a decoding stage 20, which includes means for error detection and correction within the limits possible by the radiopaging code used. The decoding stage 20 checks addresses transmitted in the appropriate frame for data transmitted to the particular pager. If a match is detected between the transmitted data and an internally stored address, then the paging receiver 18 remains energized so that the concatenated message data codewords appear at the output of the stage 20, which output is connected to a microcontroller 22. A keypad 24 and one or more alerting devices, such as vibrator 26, acoustic transducer 28 or a light emitting device, e.g., LED 30, are connected to the microcontroller 22. The microcontroller 22 is arranged to supply suitably encoded data codewords to the LED 30 substantially contemporaneously with their receipt by the receiver 18, subject to signal processing delays.

If the pager 16 is of the type that can store its own messages, then a RAM 32 for storing message data is connected to the microcontroller 22 together with a LCD panel with associated drivers 34. Thus, message codewords from the decoding stage 20 are supplied as a stream of, for example, ISO 7-bit characters to the RAM 32 by the microcontroller 22. When a user wishes to display the message data, he actuates the keypad 24 to cause the microcontroller 22 to supply the ISO 7 bit characters to the LCD drivers 34 for display on the panel.

A separate user equipment, such as an electronic notice board 36, is optically coupled to the LED 30 by a suitably terminated optical fiber 38. The optical fiber 38 is connected to a RS 232 converter 40, which includes a light detector and a signal processor for converting received binary coded optical signals into electrical signals. The electronic notice board 36 comprises a) signal processing means 42, including signal storage means, having an input connected to the converter 40 and b) a video display unit 44, which comprises a display means and driving circuitry.

In operation, the electronic notice board 36 displays data stored in its signal processing means 42. However, if the data is to be updated either on an individual basis or a group basis, then this is done by transmitting a message paging signal from the base station using an individual or a group address radio identification code (RIC).

A pager recognizing its RIC remains energized to receive the message codewords, which are decoded and relayed to the microcontroller 22. It passes the codewords, re-encoded as ISO 7-bit characters if required, to the LED 30, which is energized in accordance with the binary coding of the message data so as to produce an optical signal version of this data. The optical signal is relayed by way of the optical fiber 38 to the RS 232 converter 40, which converts it to an electrical signal suitable for storage in the processor 42.

Figure 2:
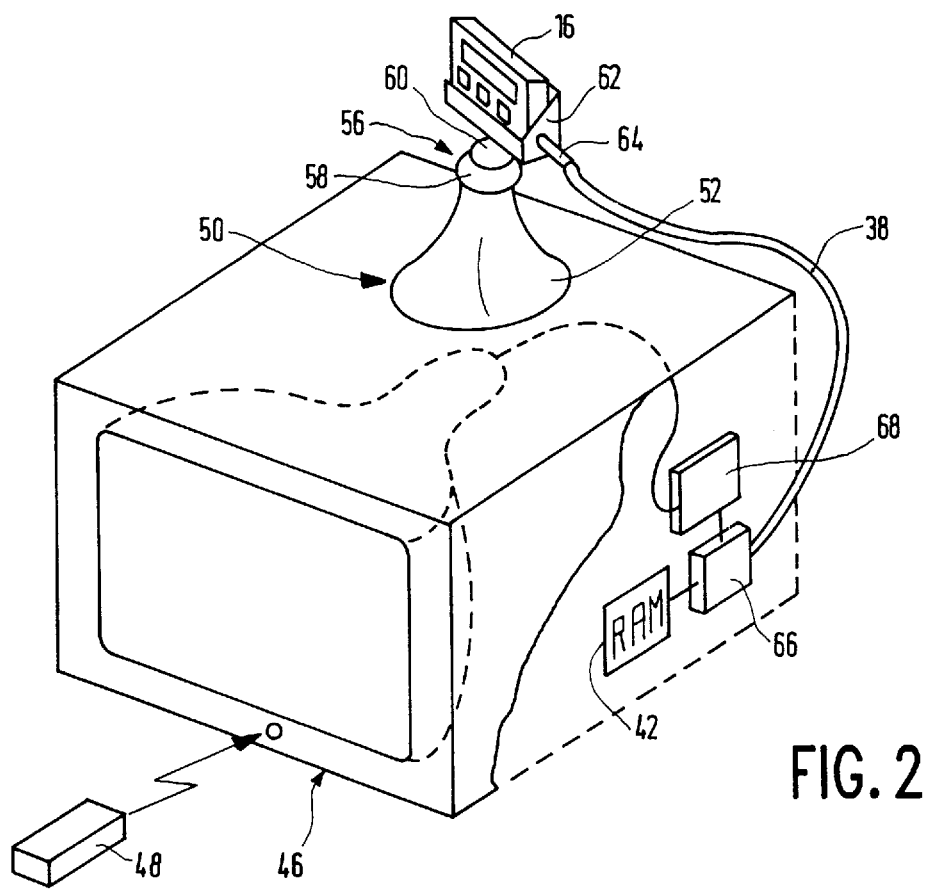
FIG. 2 is a diagram illustrating the mounting of a pager on the housing of a tv set (or monitor)

When the pager 16 is of the type that can store messages, then, optionally, message data can be stored in the RAM 32 for subsequent transfer to the LED 30 and onward transmission to the processor 42. Referring to FIG. 2, a TV set (or computer type monitor) 46, which may be controlled manually or by an infra-red remote controller 48, has a means 50 for detachably mounting a pager 16. The means 50 comprises a base member 52 that includes means, e.g., a suction cup, Velcro, clamps, magnetic surface, screws, or the like, for attaching the member 52 semi-permanently to the top or side surface of the TV set 46. A two-part universal joint type of mounting means 56 is provided at the opposite end of the base member 52. The universal joint shown in FIG. 2 comprises a part-spherical cup 58 attached to the base member 52 and a ball 60 which is a friction fit in the cup 58. A mounting bracket 62 is attached to the ball 60 so as to be moveable therewith. Other known types of universal joint type of mounting means 56 may be used, including providing a clamping device provided on the base member 52 which can be used to clamp a ball when the optimum position of the pager has been determined. The mounting bracket 62, which may comprise a light-tight box, has a socket 64 for receiving one end of an optical fiber 38, the other end of which is coupled to an optical/electrical transducer and decoder 66. A RAM 42 stores the decoded data until it is required by the user. In response to an instruction for the data to be displayed, the decoder 66 reads-out the data from the RAM 42 and supplies it to the display circuitry 68 of the TV set (or monitor) 46. Optionally the data messages are displayed as soon as they are received by the pager 16.

A user places his/her pager 16 in the mounting bracket 62 so that the LED 30 (FIG. 1) is aligned with the socket 52 and switches the TV set 46 to receive signals from a non-broadcast source. The user then adjusts the mounting bracket 62, by way of the universal joint, to obtain an acceptable, if not optimum for the location and orientation of the TV set 46, angular position for the pager 16 to receive paging signals. One method by which the user can determine an acceptable angular position for the pager 16 is for the pager decoder 20 (FIG. 1) to measure the error rate in the decoded signal and for the microcontroller 22 (FIG. 1) to send the error rate to be displayed on the TV set or other display means. The mounting bracket 62 carrying the pager 16 is then adjusted until the error rate is zero or has a minimum value. Since all pagers operating in accordance with the POCSAG protocol are energized to receive the sync codewords, the error check can be done on the sync codewords. Once an acceptable position has been found, further adjustment is unnecessary. Inability to receive the sync codeword at all, i.e., after trying all possible positions, tends to indicate that the pager 16 is out of range or defective.

By suitably adapting the pager 16 and the TV set 46, the pager can derive its electrical power from the TV set. Also, paging signals derived from the TV set's antenna may be supplied to the pager. However, such options are not always possible with pagers because their small physical size can limit the number of extra external electrical connections which can be provided.

Figure 3:
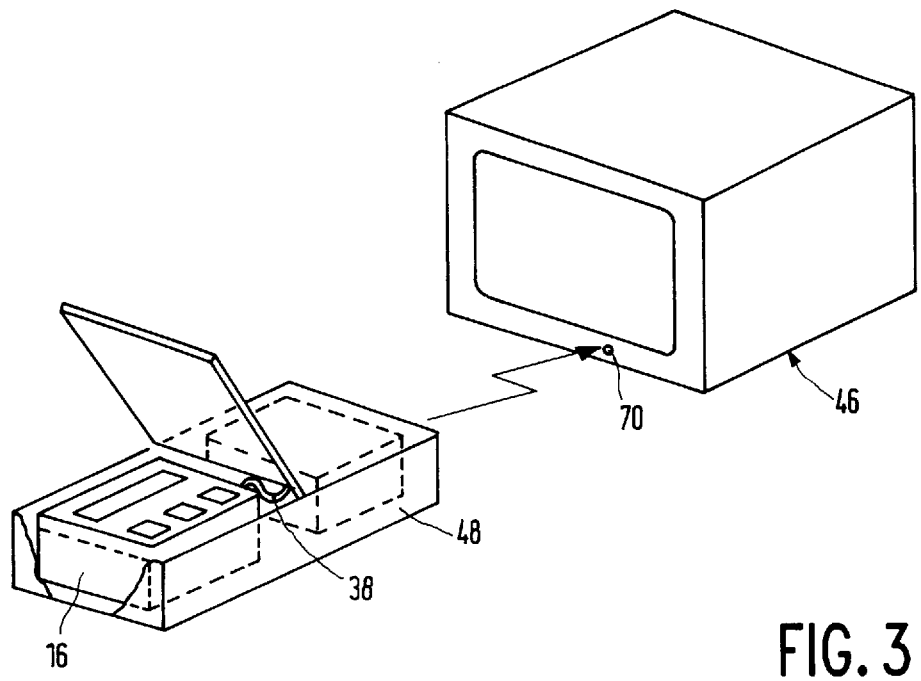
FIG. 3 is a diagram illustrating the mounting of a pager in a remote controller.

FIG. 3 illustrates another variant in which a TV set remote controller 48 is adapted to receive the pager 16 and for data messages to be transmitted to a detector 70 on the TV set by way of an infra-red link. The data messages are stored in a RAM (not shown) for subsequent display. The signal coupling of the pager 16 to the circuitry of the remote controller 48 is by way of an optical link, for example, an optical fiber 38. The display panel of the pager 16, if visible, or of the remote controller 48, can be used to display the error rate. Alternatively, it can be displayed on the screen of the TV set 46, as described hereinabove with reference to FIG. 2. Although not shown, a mouse of a personal computer can be adapted in this way to enable pager messages to be displayed on the monitor screen.

In the described and illustrated embodiments since the pager 16 is not electrically connected to the electronic notice board, TV set or other display device then one or two type approved pagers can be used with a large variety of electric notice boards or other display devices. The pager 16 can be positioned for the optimum reception of radio signals and can be separate from other sources of radio interference.

Although in the described embodiment light in the visible part of the spectrum is produced by the LED 30, other emitters, such as infra red emitters, may be used with appropriate detectors, for example, as used in television remote controllers.

The means 50 for detachably mounting the pager 16 can be incorporated inside of TV set 46. If so, and if the portion of the TV set 46 in which the pager is located is a) light-tight or b) suitably reflective, or the pager 16 has multiple LEDs, e.g., each oriented in a different direction, such as one from each face of the pager 16, then the pager 16 need not be coupled by a fiber optic link to the TV set 46, but instead a free space optical link may be employed. Also, the means 50 may be mounted on any suitable surface of the TV set 46, and it may be oriented in any direction.

One category of user equipment that may be used instead of the TV set (or monitor) 46 is printers. Another category of user equipment that may be used instead of the TV set (or monitor) 46 are control devices that respond to particular messages from the pager 16 to effect actions, such as turning on or off a light, changing a heating/cooling setting, activating a burglar alarm, or the like.

The foregoing merely illustrates the principles of the invention. It will be appreciated that those skilled in the art will be able to devise various arrangements which, although not explicitly described or shown herein, embody the principles of the invention and are thus within its spirit and scope. Such arrangements may involve equivalent features and other features which are already known in the design, manufacture and use of information transmission systems and devices and component parts thereof, and which may be used instead of or in addition to, features already disclosed herein.

What is claimed is:

1. A display apparatus comprising:
   (a) a portable, point-to-point radio apparatus, said radio apparatus comprising means for receiving point-to-point radio messages, means for determining if a radio message is intended for the radio apparatus and, if it is, for decoding the radio message, means for determining the quality of a received radio message, and means for modulating a light source with information contained in the decoded radio message;
   (b) a display unit not requiring radio-type approval as a point-to-point radio apparatus, said display unit having means for receiving optical information representing the information in the decoded radio message, means for converting the optical information into an electrical version of the optical information and video display means for displaying images in response to applying the electrical version of the optical information;
   (c) an optical fiber interconnecting an output of the radio apparatus with an input to the display unit; and
   (d) means for adjustable mounting of the radio apparatus so that it can receive the radio message at an acceptable quality as determined by the quality determining means and thereby enable said display unit to be positioned for maximum desired viewability.

2. An apparatus as claimed in claim 1, wherein the quality determining means comprises means for measuring the error rate in a received radio message and for transmitting the error rate as an optical radiation signal for display on said display unit.

3. An apparatus as claimed in claim 1, wherein said means for adjustable mounting the radio apparatus is semi-permanently affixed to the display unit.

4. An apparatus as claimed in claim 1, wherein the display apparatus comprises an electronic noticeboard.

5. An apparatus as claimed in claim 1, wherein the display apparatus comprises one from the group consisting of a TV set and a computer monitor.

6. An apparatus as claimed in claim 1, wherein the display apparatus is a remote controlled TV set and wherein the information in the decoded radio message is coupled to said TV set via the remote controller over a link, at least a portion of said link comprising the optical fiber.

* * * * *